US009696479B2

United States Patent
Hugel et al.

(10) Patent No.: US 9,696,479 B2
(45) Date of Patent: Jul. 4, 2017

(54) OPTICAL DEVICE AND METHOD FOR MANUFACTURING SUCH A DEVICE

(71) Applicant: OPTINVENT, Rennes (FR)

(72) Inventors: Xavier Hugel, Rennes (FR); Pascal Benoit, Rennes (FR); Guilhem Dubroca, Rennes (FR); Khaled Sarayeddine, Rennes (FR)

(73) Assignee: OPTINVENT, Rennes (FR)

( * ) Notice: Subject to any disclaimer, the term of this patent is extended or adjusted under 35 U.S.C. 154(b) by 0 days.

(21) Appl. No.: 14/424,846

(22) PCT Filed: Aug. 21, 2013

(86) PCT No.: PCT/EP2013/067417
§ 371 (c)(1),
(2) Date: Feb. 27, 2015

(87) PCT Pub. No.: WO2014/033035
PCT Pub. Date: Mar. 6, 2014

(65) Prior Publication Data
US 2015/0268401 A1    Sep. 24, 2015

(30) Foreign Application Priority Data
Aug. 30, 2012    (FR) ...................... 12 58111

(51) Int. Cl.
*F21V 8/00*    (2006.01)
*G02B 6/34*    (2006.01)
*G02B 6/42*    (2006.01)

(52) U.S. Cl.
CPC ........... *G02B 6/0016* (2013.01); *G02B 6/003* (2013.01); *G02B 6/0031* (2013.01);
(Continued)

(58) Field of Classification Search
CPC .... G02B 6/0016; G02B 6/003; G02B 6/0031; G02B 6/0065; G02B 6/34
(Continued)

(56) References Cited

U.S. PATENT DOCUMENTS 6,411,438 B1 *    6/2002    Itoh ........................ G02B 27/28
                                                    348/E9.027
6,469,755 B1 *    10/2002    Adachi ................ G02B 6/0018
                                                    349/62

(Continued)

FOREIGN PATENT DOCUMENTS

JP        2005-316304 A    11/2005

OTHER PUBLICATIONS

Nov. 15, 2013 Search Report issued in International Application No. PCT/EP2013/067417.

*Primary Examiner* — Ellen Kim
(74) *Attorney, Agent, or Firm* — Oliff PLC; R. Brian Drozd

(57) ABSTRACT

An optical device includes an optical guide adapted for propagating a light beam by successive total internal reflections and an injection device adapted for injecting the light beam into the optical guide via an injection section. A polarizing material is present between the optical guide and the injection device at the injection section. The injection device includes a prism and an assembly formed by a quarter-wave plate and curved mirror, the injection device being arranged so that a light beam reflected by the polarizing material in the direction of the curved mirror passes through the quarter-wave plate and is then reflected by the curved mirror in the direction of the polarizing material and passes through the quarter-wave plate again.

10 Claims, 3 Drawing Sheets

Figure 1:
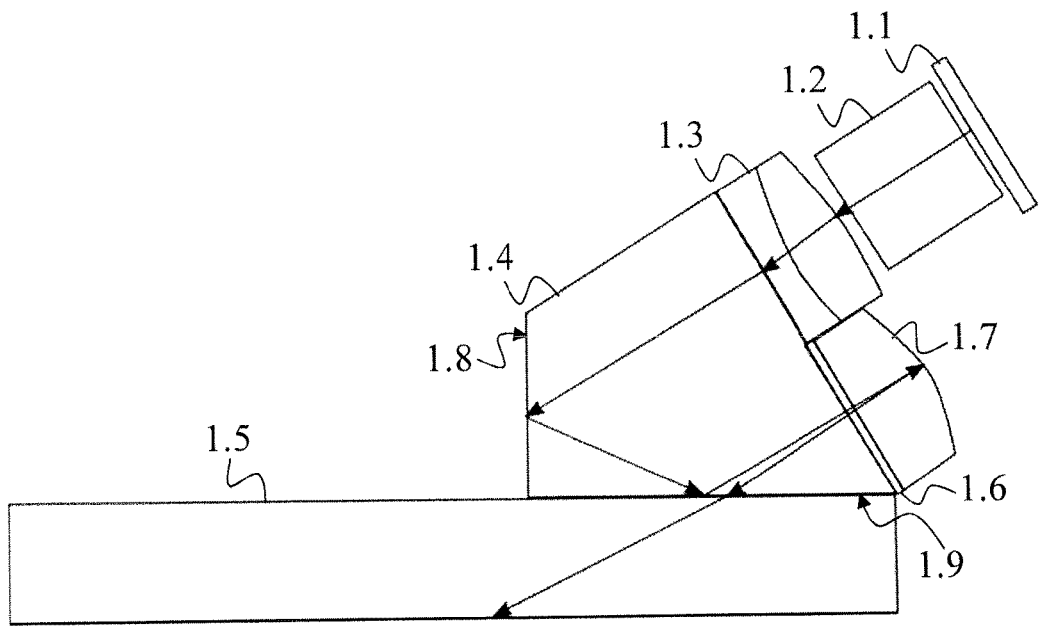

(52) U.S. Cl.
CPC ............ _G02B 6/0065_ (2013.01); _G02B 6/34_ (2013.01); _G02B 6/4298_ (2013.01); _Y10T 29/49826_ (2015.01)

(58) Field of Classification Search
USPC ........................................ 385/33, 36; 29/428
See application file for complete search history.

(56) References Cited

U.S. PATENT DOCUMENTS

| | | | |
|---|---|---|---|
| 6,829,412 B2* | 12/2004 | Li | ........................ G02B 6/0006 348/E9.027 |
| 2007/0064310 A1 | 3/2007 | Mukawa et al. | |
| 2009/0052047 A1 | 2/2009 | Amitai | |

* cited by examiner

OPTICAL DEVICE AND METHOD FOR MANUFACTURING SUCH A DEVICE

The present invention concerns the field of optical devices comprising an optical guide and a device for injecting a light beam into the optical guide.

An optical guide generally comprises an injection section via which the light beam transporting an image is introduced. The optical guide enables the light beam to propagate by total internal reflection, optionally by means of a specific treatment of the walls of the optical guide. The light beam thus propagates as far as an extraction section enabling its exit from the optical guide. The extraction section may consist of a reflector terminating the optical guide by means of an inclined plane.

In order to inject the light beam into the optical guide, an injection device based on the implementation of a prism is used. This prism is either moulded in one piece with the optical guide, or two separate parts are assembled. To achieve the required precision, moulding the prism and optical guide in the same piece is expensive and tricky to achieve. Adding a separate prism is often favoured, but poses a problem of space requirement, in particular with regard to the use of a complementary optical system based on lenses for generating a collimated beam.

It is desirable to overcome these various drawbacks of the prior art.

It is in particular desirable to provide a solution with a reduced space requirement.

It is also desirable to provide a solution that is simple and reliable to manufacture at low cost.

The invention concerns an optical device comprising an optical guide adapted for propagating a light beam by successive total internal reflections and an injection device adapted for injecting the light beam into the optical guide via an injection section. The optical device is such that a polarising material is present between the optical guide and the injection device at the injection section, and the injection device comprises a prism and an assembly formed by a quarter-wave plate and curved mirror, the injection device being arranged so that a light beam reflected by the polarising material in the direction of the curved mirror passes through the quarter-wave plate and is then reflected by the curved mirror in the direction of the polarising material and passes through the quarter-wave plate again. Thus the overall size of the optical device is reduced.

According to a particular embodiment, the prism comprises a reflective face, the injection device being arranged so that a light beam reflected by the polarising material in the direction of the curved mirror is previously reflected by said reflective face. Thus, for the same overall size of the optical device, elements providing the injection of the light beam into the prism are distant from the field of vision of a user of the optical device. The ergonomics is thus improved.

According to a particular embodiment, said reflective face forms an angle of 90° with a face of the prism against which said polarising material is placed. Thus the manufacture of the optical device is simplified and the costs are reduced compared with the prior art.

According to a particular embodiment, the optical device being intended to be used with a polarised light source supplying said light beam, the injection device comprises at least one lens intended to be placed between said polarised light source and the prism. Thus aberrations can be corrected.

According to a particular embodiment, the injection device comprises a doublet intended to be placed between said polarised light source and the prism, the doublet being such that it comprises a flat face. Thus the doublet can easily be glued to the prism, which simplifies the manufacture of the optical device.

According to a particular embodiment, the optical device being intended to be used with a polarised light source supplying said light beam, the injection device comprises at least one half-wave plate intended to be placed between said polarised light source and the prism. Thus the polarisation of the light beam can be adapted to the polarising material used.

According to a particular embodiment, the curved mirror comprises an aspheric reflective surface. Thus the sharpness of an image diffused by the optical guide is better.

The invention also concerns a method for manufacturing an optical device comprising the following steps: obtaining an optical guide adapted for propagating a light beam by successive total internal reflections; obtaining an injection device comprising a prism and an assembly formed by a quarter-wave plate and a curved mirror, the injection device being intended to inject the light beam into the optical guide via an injection section. The method is such that it further comprises the following step: assembling the injection device and the optical guide with placement of a polarising material between the optical guide and the injection device at the injection section, the assembly being such that a light beam reflected by the polarising material in the direction of the curved mirror via the quarter-wave plate is reflected by the curved mirror in the direction of the polarising material via the quarter-wave plate. Thus the manufacturing method enables obtaining an optical device of reduced size.

According to a particular embodiment, the method comprises the following steps: obtaining a doublet, with a flat face, suitable for correcting chromatic aberrations caused by the passage of the light beam from the curved mirror to an extraction section of the optical guide; assembling the doublet and the prism, said flat face being placed against the prism. Thus an image diffused via the optical guide has better rendition.

According to a particular embodiment, the method comprises the following steps: obtaining a doublet, with a flat face, suitable for correcting chromatic aberrations caused by the passage of the light beam from the curved mirror to an extraction section of the optical guide; assembling the doublet and the prism, a half-wave plate being interposed between said flat face and the prism. Thus the polarisation of the light beam can be adapted to the polarising material used.

Figure 2:
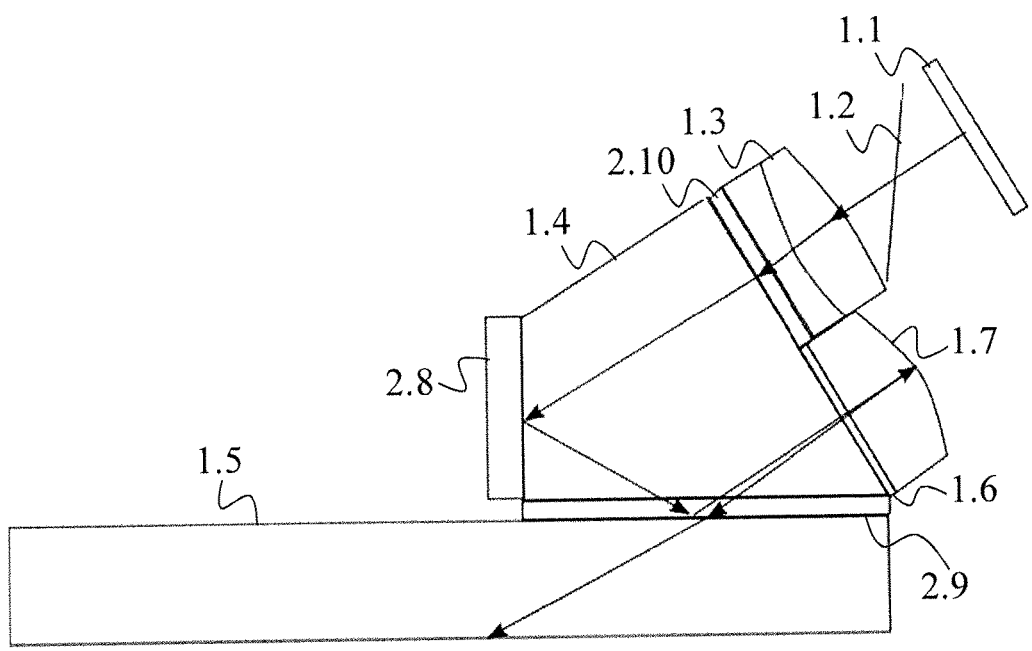
Figure 3:
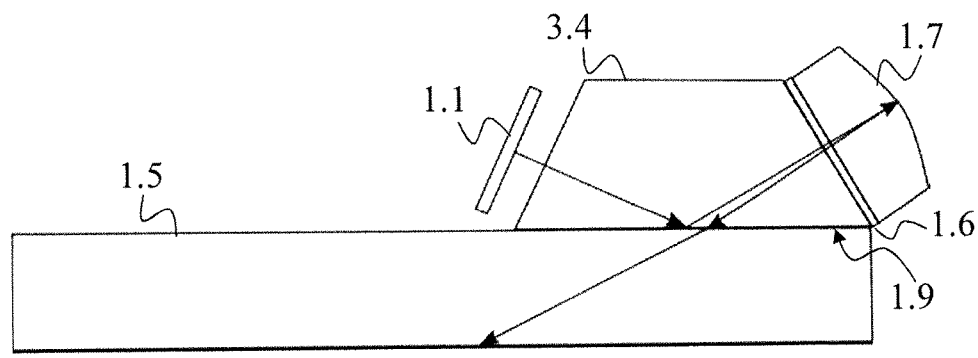
Figure 4:
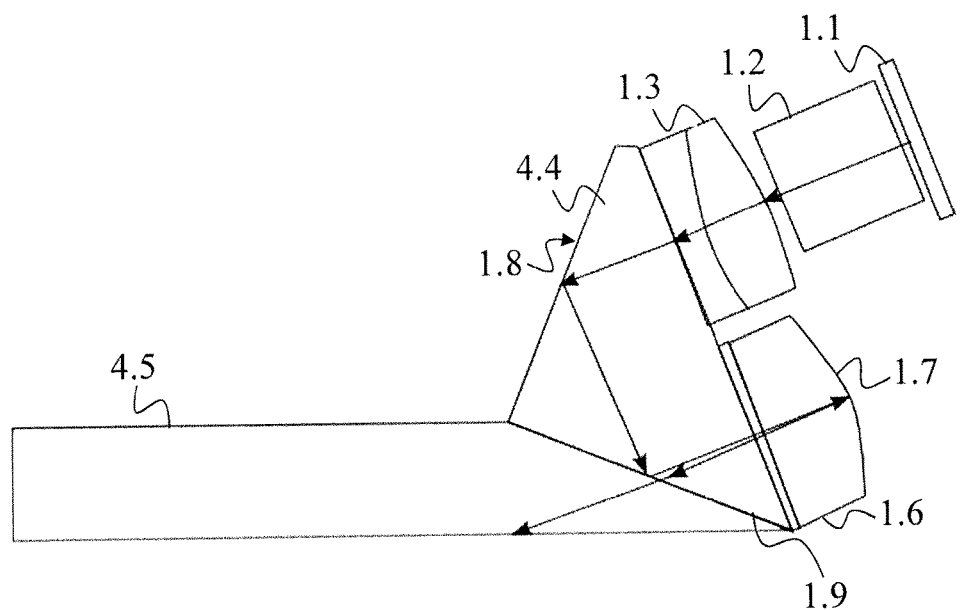
Figure 5:
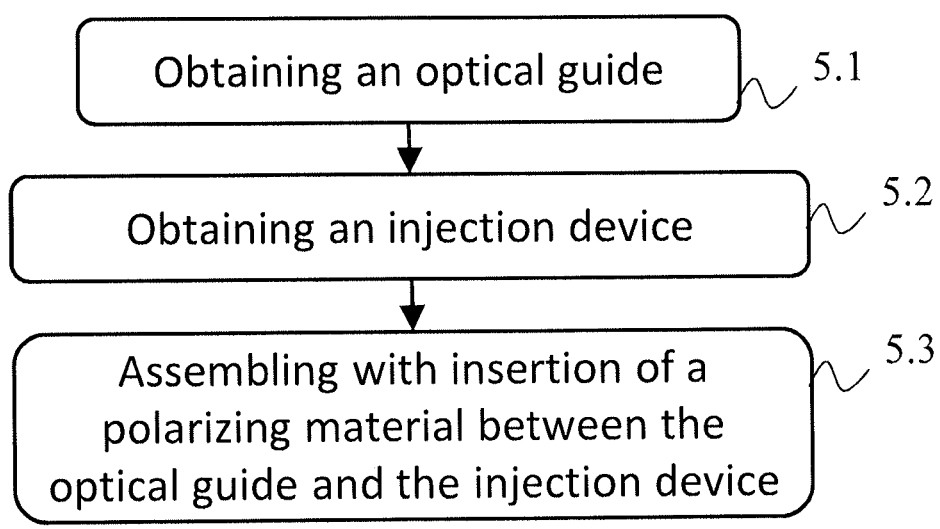

The features of the invention mentioned above, as well as others, will emerge more clearly from a reading of the following description of an example embodiment, said description being given in relation to the accompanying drawings, among which:

FIG. 1 schematically illustrates a first optical device;
FIG. 2 schematically illustrates a second optical device;
FIG. 3 schematically illustrates a third optical device;
FIG. 4 schematically illustrates a fourth optical device.
FIG. 5 schematically illustrates steps of manufacturing such optical devices.

In order to reduce the size of an optical device comprising an injection device and an optical guide, it is proposed to place a polarising material between the injection device and the optical guide. The injection device serves to inject a light beam into the optical guide via the polarising material. The injection device is based on the use of a prism on which a quarter-wave plate and curved mirror are placed, the latter generating a collimated beam. The arrangement is such that the light beam injected is reflected by the polarising material in the direction of the curved mirror, which returns it towards this polarising material. As the quarter-wave plate is passed through twice, the light beam reflected by the curved mirror to the polarising material is transmitted, by the polarising material, in the optical guide.

The invention will be described with reference to a particular embodiment intended to be used in an ocular-vision optical system. The invention may however be used in any other field using such optical guides, such as screens integrated in a car windscreen or in the cockpit of an aircraft.

FIG. 1 schematically illustrates a first optical device. The first optical device comprises an optical guide 1.5, made from a transparent material, adapted for propagating a light beam by successive total internal reflections. The optical guide 1.5 is for example a plate with parallel faces.

The optical guide 1.5 comprises an injection section on one of its faces that are parallel to the direction of propagation of the light beam, via which the light beam is injected. The optical guide 1.5 further comprises an extraction section (not shown) on one of its faces that are parallel to the direction of propagation of the light beam, via which the light beam emerges as far as the eye of a user. Reference can be made to the patent FR 2 925 172 B1, which describes an optical guide provided with an extraction section consisting of reflective microstructures formed on the surface of the optical guide. These microstructures consist of prisms having an angle enabling the light beam to exit the optical guide. The microstructures are spaced apart by interstitial spaces formed on the surface of the optical guide. These interstitial spaces, i.e. not covered by microstructures and fitting between the latter, are transparent and thus enables obtaining the see-through effect. This enables seeing the image transported by the light beam, as well as the scenes beyond the optical guide.

The first optical device further comprises an injection device based on a prism 1.4 for injecting the light beam into the optical guide 1.5 via the injection section. The prism 1.4 is interposed between a polarised light source and the optical guide 1.5. The polarised light source is for example obtained by means of a source 1.1 of the LCD (Liquid Crystal Display) or LCoS (Liquid Crystal on Silicon) type, coupled to a polariser 1.2 by beam splitting (PBS, standing for Polarizing Beam Splitter). Beam-splitting polarisers separate an incident beam into two beams with different polarisations, generally rectilinear and perpendicular to each other. Beam-splitting polarisers have the advantage of absorbing very little light. An absorptive polariser may however be used.

The injection device may further comprise at least one lens interposed between the polarised light source and the prism 1.4, so as to correct aberrations, among other things, chromatic aberrations. This is because, as detailed hereinafter, the first injection device comprises a curved mirror 1.7. The length of the path that the light beam must travel between the curved mirror 1.7 and the extraction system may introduce chromatic aberrations since the refractive index of the material constituting the optical guide 1.5 varies according to the wavelength. One alternative consists of selecting a material for manufacturing the prism 1.4 that is adapted for compensating for these chromatic aberrations. A doublet 1.3 of lenses is preferentially implemented. Such a doublet typically consists of a divergent lens with a high refractive index and high dispersion, and a convergent lens with a low refractive index and low dispersion. Diffractive lenses could also be used.

The polarised light is therefore injected thus into the prism 1.4, and the polarised light strikes a reflective face 1.8 of the prism 1.4, this reflective face 1.8 being opposite to the one via which the polarised light is injected. With regard to the first optical device, the reflective face 1.8 is produced by metal deposition, for example of aluminium, which enables obtaining a reflective effect within a reduced space.

The first optical guide is further adapted so that the prism 1.4 and the optical guide 1.5 are separated by a polarising material 1.9 at the injection section. With regard to the first optical device, implementation of the polarising material 1.9 is achieved by deposition of thin layers forming a surface separating two polarisation states. Metal wires with a small diameter, around 200 nm, can also be used to form a grid polariser. These two approaches enable obtaining a polarising effect within a reduced space.

The polarising material 1.9 is such that it reflects any light beam wherein the polarisation state is that of the light beam reflected by the reflective face 1.8, i.e. that of the light beam injected into the prism 1.4 in the context of the first optical device. The polarising material 1.9 is furthermore such that any light beam in another polarisation state passes through it.

The injection device further comprises, on a face opposite to the reflective face 1.8, a delay plate 1.6 of the quarter-wave type. A delay plate is an optical-material element capable of modifying the polarisation of a light ray passing through it. Unlike a polariser, the polarisation state of the light at the exit from the delay plate depends on the state at the entry. This effect stems from the birefringence of the crystal, often quartz or Iceland spar, from which the plate is made. Stretch polymer films, or a liquid crystal the molecules of which have been oriented, may also be used, so as to facilitate the gluing on the prism 1.4 and the optical guide 1.5 and/or to reduce the manufacturing costs. Since the polarisation of a light beam can be represented in accordance with two components, a delay plate delays one of these two components with respect to the other, meaning causes a phase difference. The most usual delay plates are half-wave plates and quarter-wave plates. Half-wave plates, often denoted λ/2 plates, create a delay of half a wavelength. They change the direction of a linear polarisation. Quarter-wave plates, often denoted λ/4 plates, create a delay of a quarter of a wavelength. Quarter-wave plates enables changing from a rectilinear polarisation to a circular polarisation, and vice versa.

The injection device further comprises, in association with the quarter-wave plate 1.6, the curved mirror 1.7 already mentioned. The reflective surface of the curved mirror 1.7 is preferentially aspheric, in order to obtain good image sharpness.

The light beam coming from the reflective face 1.8 of the prism 1.4 is reflected by the face of the prism 1.4 where the polarisation material 1.9 is placed. The light beam then passes through the quarter-wave plate 1.6 and is reflected on the curved mirror 1.7, and then passes through the quarter-wave plate 1.6 again. The quarter-wave plate 1.6 being passed through twice, the same effect as half-wave plate is obtained. The polarisation state of the light beam then changes from a state where the beam is reflected by the face of the prism 1.4 against which the polarising material 1.9 is placed to a state where the beam passes through the polarising material. After having passed through the quarter-wave plate 1.6 for the second time, the light beam therefore passes through the face of the prism 1.4 where the polarising material 1.9 is placed and is thus injected into the optical guide 1.5. The light beam next propagates by successive total internal reflections as far as the extraction section.

Preferentially, the reflective face 1.8 of the prism 1.4 forms an angle of 90° with the face where the polarising material 1.9 is placed, which enables, on the same face, for light to be injected into the prism 1.4 and for the assembly formed by the quarter-wave plate 1.6 and the curved mirror 1.7 to be placed. The face where the injection of the light takes place and where the assembly formed by the quarter-wave plate 1.6 and the curved mirror 1.7 is placed forms an acute angle with the face where the polarising material is placed. An angle different from 90° between the reflective face 1.8 and the face where the polarising material 1.9 is placed involves a prism with a pentagonal-shaped cross section, the injection of light into the prism and the assembly formed by the quarter-wave plate 1.6 and the curved mirror 1.7 then being placed on the same side of the prism but on different faces. Manufacture of the prism, when it has a quadrilateral cross section, is then facilitated thereby.

It should be noted, as presented in FIG. 4, that the injection section may be non-parallel to the direction of propagation of the light beam in the optical guide. The optical guide, denoted 4.5 in FIG. 4, then has a form such that its thickness decreases linearly at the injection zone compared with the rest of the optical guide 4.5, the thickness of the optical guide 4.5 thus being greater in the direction of the extraction zone. The form of the prism, denoted 4.4 in FIG. 4, is then adapted accordingly, the other elements remaining identical.

FIG. 2 schematically illustrates a second optical device. The second optical device repeats in substance the elements of the first device described in relation to FIG. 1. The reflective face of the prism 1.4 is however produced therein by gluing or assembling a flat mirror 2.8 on this face, and the polarising material is produced therein by gluing a polarising plate 2.9 such that it reflects any light beam the polarisation state of which is that of the light beam reflected by the reflective face of the prism 1.4 and such that it has any light beam in another polarisation state pass through it.

The injection device of the second optical device further comprises a half-wave plate 2.10 between the doublet 1.3 and the prism 1.4. This makes it possible to put the light beam in the polarisation state in which the light beam must be in order to be reflected by the polarising plate 2.9 when the light beam is not in this polarisation state on emerging from the polariser 1.2. The half-wave plate 2.10 can also be placed between the doublet 1.3 and the polariser 1.2. The arrangement in FIG. 2 facilitates the production of the second optical device by using a doublet with a flat face against which the half-wave plate 2.10 is bonded, which is itself bonded to the prism 1.4. The presence of mechanical elements for providing the assembly is thus avoided. It should be noted that this form of the doublet 1.3 also makes it possible to bond it directly on the prism, as presented in FIG. 1.

FIG. 3 schematically illustrates a third optical device enabling getting rid of the reflective face of the prism 1.4. The light beam is then injected via a face of a prism 3.4 opposite to the one where the quarter-wave plate 1.6 and the curved mirror 1.7 are placed. The light beam is then injected in the direction of the polarising material 1.9, which reflects it in the direction of the quarter-wave plate 1.6 and the curved mirror 1.7.

The form of the prism 3.4 differs from that of the prism 1.4 in that the face of the prism 3.4 forms an acute angle with the face where the polarising material is placed, this acute angle being substantially equal to the one formed by the face where the quarter-wave plate 1.6 and the curved mirror 1.7 are placed forms with the face where the polarising material 1.9 is placed.

FIG. 5 schematically illustrates steps of manufacturing such optical devices.

In a step 5.1, the optical guide 1.5, 4.5 is obtained for example by moulding.

In a step 5.2, an injection device is obtained. The injection device comprises at a minimum a prism on which the quarter-wave plate 1.6 and the curved mirror 1.7 are glued. The form of the prism is in this case that of the prism 3.4. In a variant, the quarter-wave plate 1.6 and the curved mirror 1.7 are mechanically assembled on the prism or any other element interdependent with the prism.

In a variant, a mirror is positioned on the prism, on a face opposite to the one where the assembly formed by the quarter-wave plate 1.6 and the curved mirror 1.7 is placed and where the light beam is intended to be injected. The form of the prism is in this case that of the prism 1.4 or 4.4. This mirror may be obtained by coating or by gluing a plate, as already mentioned in relation to FIGS. 1 and 2.

In another variant, the doublet 1.3 is assembled on the prism. The doublet 1.3 preferentially comprising a flat face, perpendicular to the travel axis of the light beam, it is glued to the prism.

In another variant, the assembly formed by the doublet 1.3 and the half-wave plate 2.10 is assembled on the prism. The doublet 1.3 preferentially comprising a flat face, perpendicular to the axis of travel of the light beam, it is glued on the half-wave plate 2.10 and the half-wave plate 2.10 is glued on the prism.

In a following step 5.3, the injection device is assembled on the optical guide 1.5, with insertion of a polarising material between the optical guide 1.5 and the injection device, the polarising material being as previously described. The assembly may be carried out by deposition of the polarising material, or by the placing of metal wires in order to form a grid polariser or of a polarisation plate.

The invention claimed is:

1. An optical device comprising
   an optical guide adapted for propagating a light beam by successive total internal reflections and an injection device adapted for injecting the light beam into the optical guide via an injection section of said optical guide, said injection section being present on one face of said optical guide,
   the injection device comprising a prism and an assembly formed by a quarter-wave plate and a curved mirror, the injection device being arranged so that a light beam reflected in the prism by a polarising material in the direction of the curved mirror passes through the quarter-wave plate and is then reflected by the curved mirror in the direction of the polarising material and passes through the quarter-wave plate again,
   wherein the polarising material is present between the optical guide and the prism of the injection device at the injection section such that the polarising material is present onto said injection section of said optical guide and onto one face of the prism of the injection device.

2. The optical device according to claim 1, wherein the prism comprises a reflective face, the injection device being arranged so that a light beam reflected by the polarising material in the direction of the curved mirror is previously reflected by said reflective face.

3. The optical device according to claim 2, wherein said reflective face forms an angle of 90° with a face of the prism against which said polarising material is placed.

4. The optical device according to claim 1, wherein, the optical device being intended to be used with a polarised light source supplying said light beam, the injection device comprises at least one lens intended to be placed between said polarised light source and the prism.

5. The optical device according to claim 4, wherein the injection device comprises a doublet intended to be placed between said polarised light source and the prism, the doublet being such it comprises a flat face.

6. The optical device according to claim 1, wherein, the optical device being intended to be used with a polarised light source supplying said light beam, the injection device comprises at least one half-wave plate intended to be placed between said polarised light source and the prism.

7. The optical device according to claim 1, wherein, the curved mirror comprises an aspheric reflective surface.

8. A method for manufacturing an optical device comprising the following steps:
    obtaining an optical guide suitable for propagating a light beam by successive total internal reflections;
    obtaining an injection device comprising a prism and an assembly formed by a quarter-wave plate and a curved mirror, the injection device being intended to inject the light beam into the optical guide via an injection section of said optical guide, said injection section being present on one face of said optical guide; and
    assembling the injection device and the optical guide with placement of a polarising material between the optical guide and the prism of the injection device at the injection section, the assembly being such that a light beam reflected in the prism by means of the polarising material in the direction of the curved mirror passes through the quarter-wave plate and is then reflected by the curved mirror in the direction of the polarising material and passes through the quarter-wave plate again and the assembly being such that the polarising material is placed onto said injection section of said optical guide and onto one face of the prism of the injection device.

9. The manufacturing method according to claim 8, comprising:
    obtaining a doublet with a flat face, adapted for correcting chromatic aberrations caused by the passage of the light beam from the curved mirror to an extraction section of the optical guide; and
    assembling the doublet and prism, said flat face being placed against the prism.

10. The manufacturing method according to claim 8, comprising:
    obtaining a doublet with a flat face, adapted for correcting chromatic aberrations caused by the passage of the light beam from the curved mirror to an extraction section of the optical guide; and
    assembling the doublet and prism, a half-wave plate being interposed between said flat face and the prism.

* * * * *